United States Patent [19]

Yamaguchi et al.

[11] 4,277,055
[45] Jul. 7, 1981

[54] CUSHIONING FENDER

[75] Inventors: Tetsuo Yamaguchi; Tomokazu Kashiwara, both of Nishinomiya, Japan

[73] Assignee: Sumitomo Rubber Industries, Ltd., Hyogo, Japan

[21] Appl. No.: 972,829

[22] Filed: Dec. 26, 1978

[30] Foreign Application Priority Data

Sep. 21, 1978 [JP] Japan .......................... 53/130741[U]
Sep. 21, 1978 [JP] Japan .......................... 53/130742[U]

[51] Int. Cl.³ .......................... F16F 1/36; B63B 59/02
[52] U.S. Cl. .................................. 267/140; 114/219
[58] Field of Search ............... 114/219; 405/211, 212, 405/215; 293/136; 267/140, 153; 188/113

[56] References Cited

U.S. PATENT DOCUMENTS

| | | | |
|---|---|---|---|
| 3,600,896 | 8/1971 | Tateisi et al. ..................... 114/219 X |
| 3,948,500 | 4/1976 | Korbuly et al. ...................... 267/140 |
| 3,999,497 | 12/1976 | Hamel ................................ 114/219 |

FOREIGN PATENT DOCUMENTS

| | | | |
|---|---|---|---|
| 2704513 | 11/1977 | Fed. Rep. of Germany ........... 114/219 |
| 491190 | 1/1974 | Japan . | |
| 4937399 | 10/1974 | Japan . | |
| 5213287 | 7/1975 | Japan ....................................... 405/212 |
| 7804001 | 10/1978 | Netherlands ............................. 114/219 |
| 886295 | 1/1962 | United Kingdom ..................... 293/136 |

*Primary Examiner*—Duane A. Reger
*Attorney, Agent, or Firm*—Birch, Stewart, Kolasch & Birch

[57] ABSTRACT

A cushioning fender adapted to be mounted on one or both of the hull of a ship and a shore installation, such as pier, wharf, quay, dock, float or the like structure for cushioning the impact of the ship against the shore installation, which generally comprises a substantially cup-like body including a circular buffer block having an impact receiving surface and a hollow support wall depending from the buffer block so as to diverge from each other in a direction away from the buffer block. A cushioning fender comprising a substantially annular body including an annular buffer block having an impact receiving surface and outer and inner support walls depending from the annular buffer block and protruding so as to diverge from each other in a direction away from the buffer block is also disclosed.

9 Claims, 13 Drawing Figures

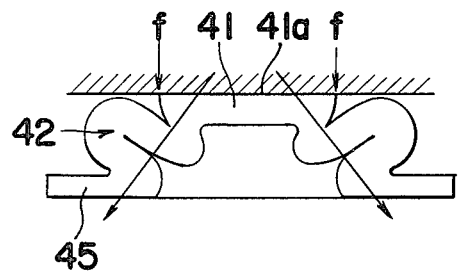
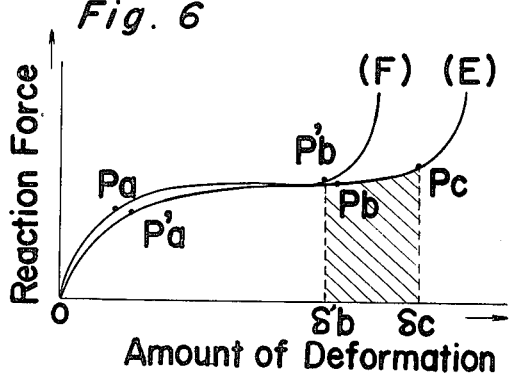
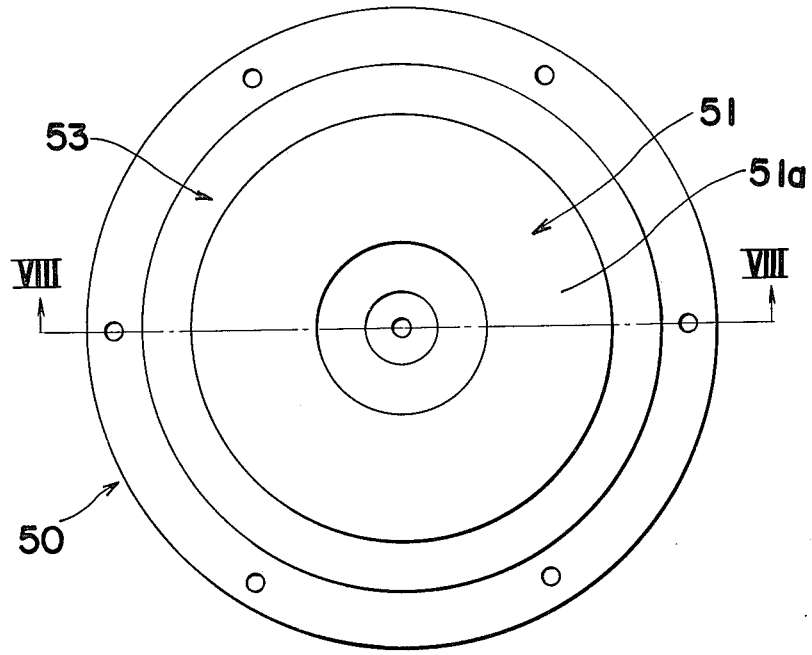
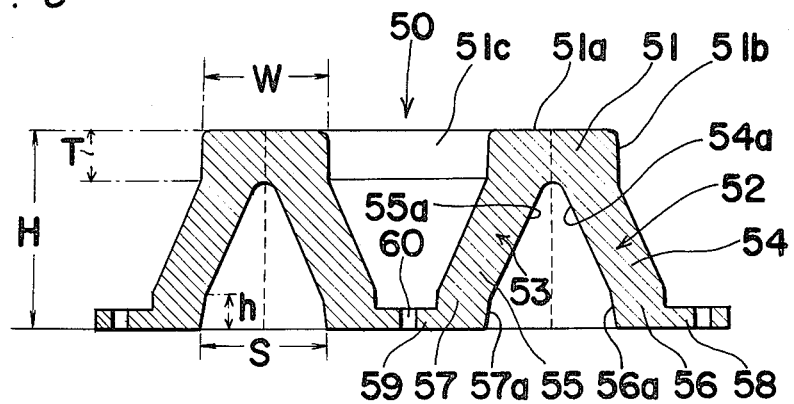

CUSHIONING FENDER

BACKGROUND OF THE INVENTION

The present invention relates to a cushioning fender adapted to be mounted on one or both of the hull of a ship and a shore installation, such as a pier, whart, quay, dock, float or the like impact receiving structure, for cushioning the impact of the ship against the shore installation.

Various types of elastically deformable fenders have long been used to cushion the impact of the ship against the shore installation for protecting both the boardside of the ship and the shore installation. Of these elastically deformable fenders, two types of substantially cup-shaped fenders are also known. By way of example, the Japanese Utility Model Publication No. 49-1190, published on Jan. 12, 1974, discloses a substantially cup-shaped fender of a construction shown in FIG. 1 of the accompanying drawings and the Japanese Patent Publication No. 49-37399, published on Oct. 8, 1974, discloses a substantially cup-shaped fender of a construction shown in FIG. 2 of the accompanying drawings.

Referring first to FIG. 1, the fender disclosed in the first mentioned publication comprises a substantially cup-like body of one-piece construction made of an elastic material and constituted by a substantially frusto-conical hollow wall 100 and a substantially cylindrical hollow wall 101 having one annular end connected to a radially outwardly enlarged annular end of the frusto-conical hollow wall 100 and the other annular end formed integrally with a radially outwardly extending fitting flange 102. This fender is so designed that, when an external load is applied thereto from, for example, the ship approaching the shore installation through a radially inwardly reduced annular end of the frusto-conical hollow wall 100 in a direction substantially perpendicular to the plane of said reduced annular end of the frusto-conical hollow wall 100, the fender body can be collapsed or compressed inwardly in a direction close towards the shore installation after having been buckled radially outwardly about the buckling point defined at the boundary between the frusto-conical hollow wall 100 and the cylindrical hollow wall 101, to such an extend as shown by the broken line in FIG. 1.

The first mentioned publication further discloses that, in order to render the fender to exhibit its optimum performance, the fender is required to satisfy the following requirements.

h=0.1H to 0.3H,
Da=0.9 to 1.5H, and
Db=0.50H to 0.85H wherein h represents the height of the cylindrical hollow wall 101 as measured from the plane of a surface of contact of any one of the fitting flanges 102 to the shore installation to the boundary between the frusto-conical hollow wall 100 and the cylindrical hollow wall 101, H represents the overall height of the fender body, Da represents the outer diameter of the cylindrical hollow wall 101 and Db represents the outer diameter of the radially inwardly reduced annular end of the frusto-conical hollow wall 100 opposite to the cylindrical hollow wall 101.

On the other hand, the fender of the construction shown in FIG. 2 is substantially disclosed in the second mentioned publication and comprises an annular fender body, generally designated by 110, of one-piece construction made of an elastic material and having a substantially V-shaped cross section defined by a buffer block 111, occupying the bottom of the shape of a figure "V", outside and inside support walls 112 and 113 respectively occupying the two lateral sides of the shape of the figure "V", and outwardly and inwardly extending fitting flanges 114 and 115 opposite to the buffer block 111 and on one side of the respective support walls 112 and 113 remote from said buffer block 111. The buffer block 111 has a flat impact receiving surface defined at 111a, the plane of which is in parallel to the plane of a surface of contact of any one of the annular outside and inside fitting flanges 114 and 115 to the shore installation to which the fender is fitted, and a pair of opposed side faces held in flush with outer faces of the respective support walls 112 and 113 which extend so as to diverge from each other in a direction away from the buffer block 111.

Although any one of the prior art fenders respectively disclosed in the first and second mentioned publications appears to function satisfactorily and effectively, the energy absorbing characteristic thereof is still low.

SUMMARY OF THE INVENTION

Accordingly, the present invention is intended to provide an improved cushioning fender of a type having an improved energy absorbing characteristic.

Another object of the present invention is to provide an improved cushioning fender of the type referred to above, which can easily manufactured without requiring the use of such manufacturing equipment as specially designed for the production of the fender of the present invention.

According to one preferred embodiment of the present invention, the cushioning fender comprises a substantially cup-like body of one-piece construction made of an elastic material and including a circular buffer block having an outer surface adapted to serve as an impact receiving surface to which a load is applied, and a hollow support wall depending from the circular buffer block and radially outwardly enlarged in a direction away from the buffer block. The hollow support wall is constituted by a leg section of uniform wall thickness and a heel section on one side of the leg section remote from the buffer block, one annular end of said heel section opposite to the leg section being formed integrally with a radially outwardly extending annular fitting flange. While an outer peripheral surface of the heel section is in flush with an outer peripheral surface of the leg section, an inner peripheral surface of the heel section may be either in flush with or at an angle relative to an inner peripheral surface of the leg section. The buffer block has its peripheral face lying in a plane at right angles to the plane of the impact receiving surface and has a diameter substantially equal to or smaller than the maximum inner diameter of the heel section and a thickness preferably within the range of 0.15H to 0.25H, H representing the overall height of the fender as measured from the impact receiving surface to the plane of an annular surface of contact of the fitting flange to the shore installation.

Preferably, where the inner peripheral surface of the heel section is at an angle relative to that of the leg section, the boundary between the inner peripheral surfaces of the respective leg and heel sections is located at a level spaced from the fitting surface plane a height within the range of 0.15H to 0.3H, H being defined as above.

Furthermore, according to another preferred embodiment of the present invention, the cushioning fender comprises an annular body of one-piece construction made of an elastic material and including an annular buffer block having an outer annular surface adapted to serve as an impact receiving surface to which a load is applied, and outer and inner support walls depending from the annular buffer block and protruding so as to diverge from each other in a direction away from the buffer block. Each of the outer and inner support walls is constituted by a leg section of uniform wall thickness and a heel section on one side of the leg section remote from the buffer block. The outer and inner support walls have respective annular fitting flanges, the annular fitting flange of the outer support wall radially outwardly extending from an annular outer end of the associated heel section remote from the leg section of the outer support wall while the annular fitting flange of the inner support walls extends radially inwardly from an annular outer end of the associated heel section remote from the leg section of the inner support wall. Preferably, the width of the annular buffer block as measured in a direction radially of the circle occupied by the annular buffer block is within the range of 0.75S to 1.3S, S representing the maximum inside span between the heel sections of the outer and inner support walls while the buffer block has radially outer and inner peripheral faces lying at right angles to the plane of the impact receiving surface and a thickness preferably within the range of 0.15H to 0.25H, H respresenting the overall height of the fender as defined above.

BRIEF DESCRIPTION OF THE DRAWINGS

These and other objects and features of the present invention will become apparent from the following description taken in conjunction with preferred embodiments thereof with reference to the accompanying drawings, in which:

FIG. 5 is a view similar to FIG. 4, showing the fender in a compressed condition;

FIG. 6 is a graph showing a performance curve of the fender shown in FIGS. 3 to 5 together with that of the prior art cup-like fender;

FIG. 7 is a top plan view of an annular fender according to another preferred embodiment of the present invention;

FIG. 8 is a cross sectional view taken along the line VIII—VIII shown in FIG. 7;

DETAILED DESCRIPTION OF THE INVENTION

Figure 1:
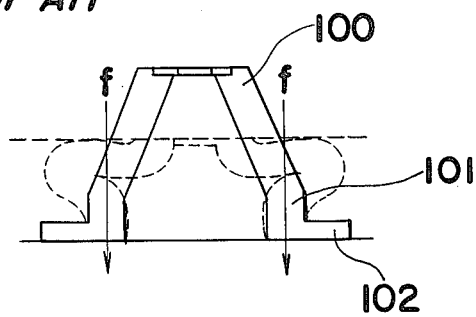
FIG. 1 is a cross sectional view of the prior art cup-like fender.

Before the description of the present invention proceeds, it is to be noted that like parts are designated by like reference numerals throughout the accompanying drawings.

Figure 3:
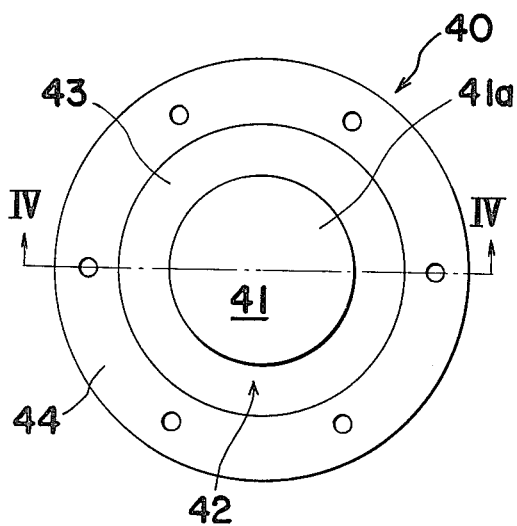
FIG. 3 is a top plan view of a cup-like fender according to one preferred embodiment of the present invention.
Figure 4:
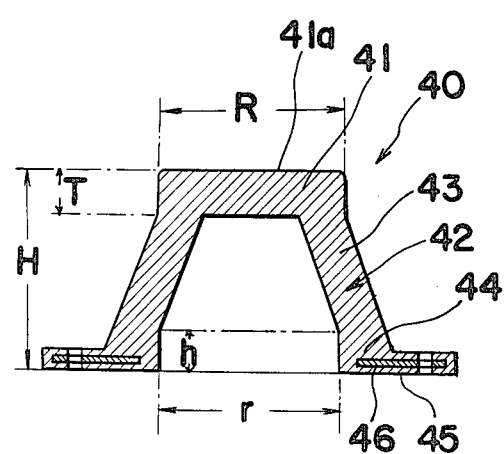
FIG. 4 is a cross sectional view taken along the line IV—IV in FIG. 3.

Referring first to FIGS. 3 and 4, a cushioning fender adapted to be mounted on, for example, a shore installation for cushioning the impact or shock given thereto by the hull of a ship approaching the shore installation comprises a substantially cup-like fender body 40 of one-piece construction made of an elastic material. The fender body 40 includes a circular buffer block 41 having an outer surface 41a adapted to serve as an impact receiving surface to which a load is applied from, for example, the hull of a ship, and a hollow support wall 42 generally depending from the circular buffer block 41 and radially outwardly enlarged in a direction away from the buffer block 41. The hollow support wall 42 is constituted by a leg section 43 of uniform wall thickness and a heel section 44 on one side of the leg section 43 remote from the buffer block 41, one annular end of said heel section 44 opposite to the leg section 43 being formed integrally with a radially outwardly extending annular fitting flange 45.

The buffer block has its peripheral face lying in a plane at right angles to the plane of the impact receiving surface 41a and has a diameter R substantially equal to or smaller than the maximum inside diameter r of the heel section 44 and a thickness T preferably within the range of (0.15×H) to (0.25×H), wherein H represents the overall height of the fender as measured from the impact receiving surface 41a to the plane of an annular surface of contact of the fitting flange 45 to the shore installation.

In view of the employment of the buffer block 41 of the predetermined thickness and of the diameter R substantially equal to or smaller than the maximum inside diameter r of the heel section 44 of the support wall 42, the fender of the construction hereinabove described with reference to FIGS. 3 and 4 can exhibit a higher energy absorbability than that of the prior art fender of the construction shown in FIG. 1, the reason for which will now be described with particular reference to the graph shown in FIG. 6.

In the prior art fender shown in FIG. 1, as the load is applied to the fender in a direction perpendicular to a plane of the annular end face of the wall 100 remote from the cylindrical wall 101, the fender is inwardly compressed with a reaction force generated thereby and, as the load is further applied, the hollow support wall is substantially radially outwardly buckled bending at the boundary between the frusto-conical hollow wall 100 and the cylindrical hollow wall 101 in a manner as shown by the broken line in FIG. 1, with a portion of the frusto-conical hollow wall 100 contacting the boardside of the ship.

On the contrary thereto, in the present invention, even though the fender of the construction shown in FIGS. 3 and 4 is inwardly compressed in a manner similar to the above described prior art fender, there is not possibility that a portion of the support wall 42, contacts the boardside of the ship when the latter is radially outwardly buckled as shown in FIG. 5. This is because of the provision of the buffer block 41 of the predetermined thickness, that is, because of the buffer block 41 outwardly protruding a predetermined distance from the radially inwardly reduced annular end of the hollow support wall 42, which predetermined distance corresponds to the thickness of the buffer block 41. The employment of the buffer block 41 of the predetermined thickness is advantageous in that the surface area to which the load acts from the hull of the ship is restricted to the effective surface area of the impact receiving surface 41a because of the fact that no portion of the support wall 42 when buckled contacts the boardside of the ship then applying the load to the fender. In addition, in view of the diameter R of the buffer block 41 being substantially equal to or smaller than the maximum inside diameter of the hollow heel section 44, the load of the hull of the ship transmitted to buffer block 41 is distributed so as to act in a diverging direction as shown by the arrows in FIG. 5 and, because of this, the further application of the load forces the support wall 42 to be buckled radially outwardly until that portion of the support wall 42 contacts the boardside of the ship. Simultaneously with the contact of that portion of the support wall 42 to the boardside of the ship, the magnitude of the reaction force generated by the fender being then compressed is rapidly increased.

The graph of FIG. 6 illustrates a performance curve E of the fender of the present invention together with a performance curve F of the prior art fender shown in FIG. 1. It is to be noted that the point Pa or P'a on the performance curve E or F represents the moment at which the respective support wall starts its buckling movement under the influence of the load, the point Pb or P'b represents the moment at which the respective support wall is buckled and the point Pc represents the moment at which that portion of the support wall when the latter are buckled contacts the boardside of the ship.

Referring now to FIG. 6, it will readily be seen that both of the prior art fender shown in FIG. 1 and that of the present invention shown in FIGS. 3 and 4 operate in a substantially similar manner so far as the first half stage of compression or deformation is involved. However, in the prior art fender, since no buffer block of the predetermined thickness is employed such as employed in the present invention, an external pushing force f given by the load of the ship acts on not only the annular end face of the support wall, but also that portion of the support wall contacting the boardside of the ship when the support wall is radially outwardly buckled as shown by the broken line in FIG. 1 and, in addition thereto, the direction in which the external pushing force f extends at right angles to the plane of a surface of contact of the fitting flange to the shore installation, resulting in that the support wall will no longer be buckled. In other words, the prior art fender of the construction shown in FIG. 1 is such that, when and after the support wall has been buckled radially outwardly at the moment P'b, the reaction force is rapidly increased.

On the contrary thereto, in the fender of the construction shown in FIGS. 3 and 4 according to the present invention, in view of the fact that the buffer block 41 of the predetermined thickness and of the diameter substantially equal to or smaller than the maximum inside diameter of the heel section is employed, the support wall 42 can, even after it has been radially outwardly buckled at the moment Pb, further be deformed to the moment Pc at which the reaction force is rapidly increased.

Considering the fact that the energy absorbability of a cushioning fender of a type to which the present invention pertains is generally evaluated in consideration of the surface area of such a region in a graph showing the performance curve thereof as encompassed by the performance curve, one of the axes of coordinates representing the amount of deformation and a line drawn from the point of start of the final rapid increase of the reaction force on the performance curve and intersecting at right angles to such one of the axes of coordinates, it will readily be understood that the fender of the construction shown in FIGS. 3 and 4 can exhibit a higher energy absorbability than that of the prior art fender by an amount corresponding to the surface area of a hatched portion shown in the graph of FIG. 6.

From the foregoing, it is clear that the provision of the buffer block 41 is advantageous in that the time at which that portion of the support wall 42 in the radially outwardly buckled condition contacts the boardside of the ship can be delayed for a substantially prolonged period of time and that, by selecting the diameter R of the buffer block 41 to be substantially equal to or smaller than the maximum inside diameter r of the heel section, the support wall 42 can be buckled further during such prolonged period of time. In order to achieve this, the thickness T of the buffer block 41 is preferably within the range of about 0.15H to about 0.25H, H representing the overall height of the fender as designated in FIG. 4. It is to be noted that, if the thickness of the buffer block 41 exceeds the uppermost limit of about 0.25H, the height of the support wall 42, which is the overall height H less the thickness T, will be forced to be relatively small.

It is also to be noted that, while an outer peripheral surface of the heel section 44 is in flush with an outer peripheral surface of the leg section 43, an inner peripheral surface of the heel section 44 may be either in flush with or at an angle relative to an inner peripheral surface of the leg section. Preferably, where the inner peripheral surface of the heel section 44 is at an angle relative to that of the leg section 43, the boundary between the inner surfaces of the respective leg and heel sections 43 and 44 is located at a level spaced from the fitting surface plane a height h within the range of about 0.15H to about 0.3H. This is advantageous in that the radially outward buckling movement of the support wall 42 can be facilitated at a level adjacent the fitting surface plane where the surface of contact of the fitting flange 45 to the shore installation lies while not only can the time at which that portion of the support wall 42 contacts the boardside of the ship be delayed, but also the fender can relatively considerably be deformed.

It is also to be noted that one or both of the buffer block 41 and the fitting flange 45 may have a reinforcement member, such as a rigid wooden or metallic plate or a woven fabric, embedded therein. In the instance as shown, the fitting flange 45 has a reinforcement member 46 embedded therein. In addition, the buffer block 41 may have a large-sized buffer plate rigidly mounted thereon for reducing the pressure concentration on the impact receiving surface 41a of the buffer block 41.

Figure 9:
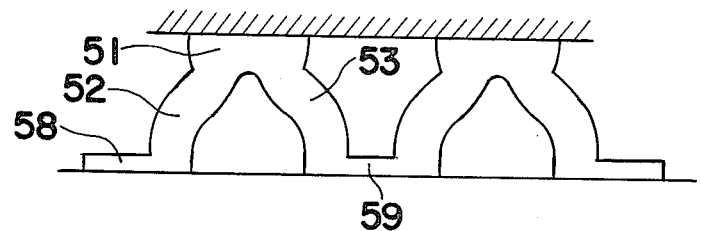
FIGS. 9(a) to 9(c) are views similar to FIG. 8, showing the sequence of compression of the fender of the construction shown in FIGS. 7 and 8.
Figure 9:
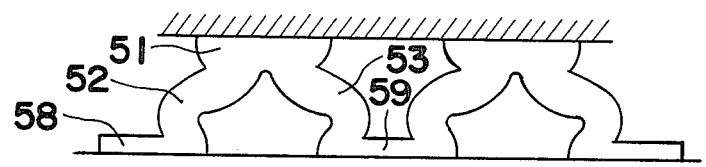
Figure 9:
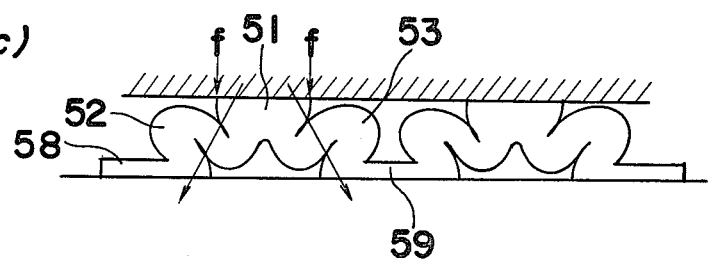

Referring now to FIGS. 7 to 9, the cushioning fender shown therein is of an annular shape and comprises an annular body, generally designated by 50, of one-piece construction made of an elastic material. The annular fender body 50 includes an annular buffer block 51 having an outer annular surface 51a adapted to serve as an impact receiving surface to which the external pushing force is applied from the hull of the ship approaching the shore installation, and outer and inner support walls 52 and 53 depending from the annular buffer block and protruding so as to diverge from each other in a direction away from the buffer block 51.

While the buffer block 51 has a predetermined thickness T as will be described later, it also has outer and inner peripheral faces 51b and 51c, the plane of each of which faces 51b and 51c is at right angles to the plane of the impact receiving surface 51a and in parallel to the axis passing through the center of curvature of any one of the outer and inner peripheral faces 51b and 51c.

Each of the outer and inner support walls 52 and 53 is constituted by a leg section 54 or 55 of uniform wall thickness and a heel section 56 or 57 on one side of the leg section remote from the buffer block 51. The outer and inner support walls 52 and 53 have respective annular fitting flanges 58 and 59, the annular fitting flange 58 of the outer support wall 52 radially outwardly extending from an annular outer end of the associated heel section 56 of the outer support wall 52 while the annular fitting flange 59 of the inner support wall 53 extends radially inwardly from an annular outer end of the associated heel section 57 of the inner support wall 53. So far illustrated, the inner annular fitting flange 59 extends radially inwardly from the heel section 57 of the inner support wall 53 in the direction towards the center of curvature of any one of the outer and inner peripheral faces 51b and 51c of the buffer block 51 to such an extent as to form a fitting opening 60 defined by the peripheral face of said fitting flange 59.

The advantage resulting from the employment of the buffer block 51 of a rectangular cross sectional shape having the predetermined thickness will now be described.

Figure 2:
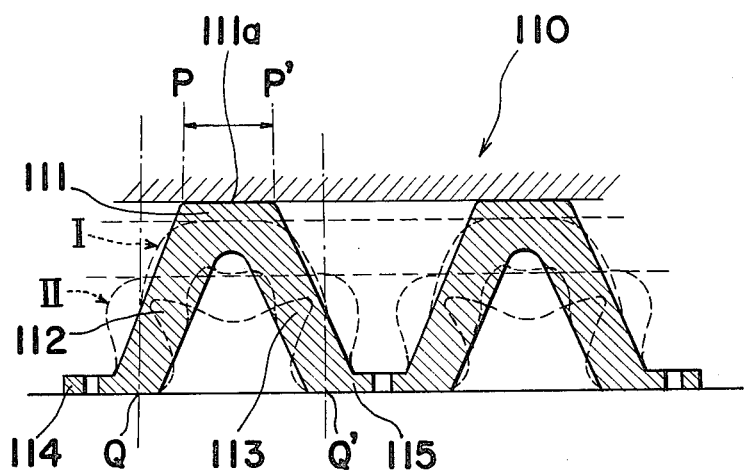
FIG. 2 is a view similar to FIG. 1, showing the prior art annular fender.

Referring first to FIG. 2, the prior art fender shown therein operates in such a manner that, when the external pushing force is applied thereto in a direction perpendicular to the plane of the impact receiving surface 111a, the buffer block 111 and the pair of the support walls 112 and 113 are compressed inwardly while inclined peripheral faces of the buffer block 111, which are respectively contiguous to external surfaces of the associated support walls 112 and 113, expand outwardly with respect to each other with a substantially intermediate portion of the buffer block 111 tending to outwardly protrude into a space between the support walls 112 and 113 as shown by the broken line I, this condition being hereinafter referred to as an initial deformation stage.

During the continued application of the external pushing force and when the prior art fender is compressed 15%, i.e., when the prior art fender is deformed to such an extent that the overall height of the fender is reduced 15% as compressed by the action of the external pushing force, the support walls 112 and 113 start their buckling movement and, when this buckling movement takes place, respective portions of the support walls 112 and 113 which are outwardly buckled with respect to each other continuously protrude outwardly of the imaginary planes passing through the fulcrums Q, about which the respective support walls 112 and 113 can pivot during the deformation, at right angles to a fitting surface plane where the surfaces of contact of the fitting flanges 114 and 115 lie. When and after the prior art fender is compressed about 45%, the buckled support walls 112 and 113 are further compressed inwardly (this condition being referred to as a final compressive deformation stage) with the reaction force of the fender rapidly increased.

Figure 10:
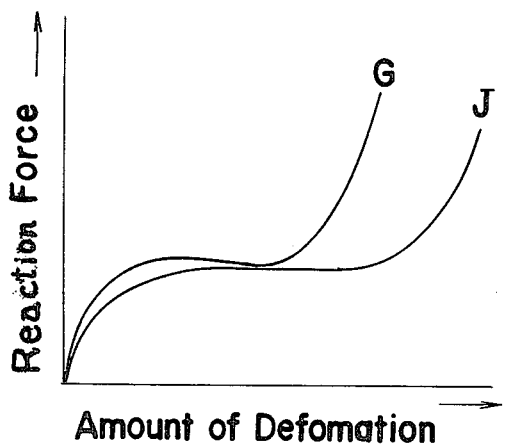
FIG. 10 is a graph showing a performance curve of the fender shown in FIGS. 7 to 9 together with that of the prior art annular fender.

The performance curve of the prior art fender of the construction shown in FIG. 2 is shown by G in the graph of FIG. 10 while that of the fender of the construction shown in FIGS. 7 to 9 according to the present invention is shown by J in the same graph of FIG. 10. From the comparison of these performance curved G and J, it will readily be seen that the final compressive deformation stage starts earlier in the prior art fender than in the fender of the present invention and the reason for this is that the buffer block 111 in the prior art fender is of a trapezoidal cross sectional shape, that is, the buffer block 111 has outer and inner peripheral faces inclined so as to diverge from each other in a direction away from the buffer block 111.

However, referring particularly to FIG. 8, in the fender according to the present invention, the buffer block 51 is of a rectangular cross section and has its outer and inner peripheral faces 51b and 51c each lying in a plane perpendicular to the plane of the impact receiving surface 51a. By the employment of the rectangular-sectioned annular buffer block 51, the time at which the respective portions of the support walls 52 and 53 contact the boardside of the ship when such support walls 52 and 53 are buckled outwardly with respect to each other as shown in FIG. 9(c), that is, the start of the final compressive deformation stage, can advantageously be delayed. For this purpose, the thickness T of the buffer block 51 is selected to be within the range of about 0.15H to about 0.25H, H representing the overall height of the fender as measured between the impact receiving surface 51a and the plane of the surfaces of contact of the fitting flanges 58 and 59 to the shore installation.

If the respective heel sections 56 and 57 of the support walls 52 and 53 are bent to protrude from the associated leg sections 54 and 55 with their inside surfaces 56a and 57a thereof forming greater angles relative to the plane of the surfaces of contact of the fitting flanges 56 and 57 to the shore installation than the respective angles of inclination of inside surfaces 54a and 55a of the associated leg sections 54 and 55, not only can the buckling movement of the support walls 52 and 53 advantageously be forced to start from portions of the support walls 52 and 53 adjacent the shore installation to which the fender body 50 is secured through the fitting flanges 56 and 57 by the use of anchoring bolts (not shown), but also the time at which the portions of the support walls 52 and 53 when the latter are outwardly buckled with respect to each other contact the boardside of the ship in a manner substantially shown in FIG. 9(c) can further be delayed. For this purpose, the height h of each of the heel sections 56 and 57 as measured from the bending point of the associated support wall 52 or 53, i.e., the boundary between the inside surfaces 56a or 57a and 54a or 55a of the respective heel and leg sections, to the plane of the surfaces of contact of the fitting flanges 58 and 59, is selected to be within the range of about 0.15H to about 0.3H, H representing the overall height of the fender as defined above.

Furthermore, since the fender of the construction shown in FIGS. 7 to 9 is so designed as to delay the time at which that portions of the support walls 52 and 53 in the buckled condition contact the boardside of the ship and, also, as to render the external pushing force f to act solely on the impact receiving surface 51a of the buffer block 51 so that, when and after the support walls 52 and 53 have been buckled outwardly with respect to each other, the external pushing force f transmitted to the support walls 52 and 53 acts in a diverging direction as shown by the arrows in FIG. 9(c) to enable a further outward deformation of the buckled support walls 52 and 53, the width W of the annular buffer block 51 is preferably equal to or smaller than the maximum inside span S between the heel sections 56 and 57 and, more preferably, within the range of 0.75S to 1.3S.

It is to be noted that, even in the embodiment shown in FIGS. 7 to 9, one or both of the buffer block 51 and the fitting flanges 58 and 59 may have a reinforcement member, such as a wooden or metallic plate or a woven fabric, embedded therein.

The fender of the construction shown in FIGS. 7 and 8 operates in the following manner.

Subsequent to the application of the external pushing force to the impact receiving surface 51a to cause the fender body 50 to be inwardly compressed in a manner as shown in FIG. 9(a), the support walls 52 and 53 start their buckling movement. When the fender body 50 is inwardly compressed about 20% as shown in FIG. 9(b), the support walls 52 and 53 are buckled outwardly with respect to each other while accummulating a relatively large amount of elastic reaction force and, when the fender body 50 is subsequently compressed about 55%, the support walls 52 and 53 are considerably buckled outwardly with respect to each other as shown in FIG. 9(c).

However, in the condition shown in FIG. 9(c), that portions of the buckled support walls 52 and 53 have not yet contacted the boardside of the ship because of the provision of the annular buffer block of the predetermined thickness. Furthermore, because of the selection of the width W of the annular buffer block 51 within the predetermined range as hereinbefore described, the external pushing force can acts in the diverging direction on the support walls 52 and 53 to cause the buckled support walls 52 and 53 to be further deformed outwardly with respect to each other. It has been found that the contact of that portions of the buckled support walls 52 and 53 to the boardside of the ship while elastic reaction force is rapidly increased, that is, the final compressive deformation stage, takes place when and after the fender body 50 has been inwardly compressed about 60%.

The performance curve of the fender of the construction shown in FIGS. 7 to 9 is shown by J in the graph of FIG. 10 and it will readily be seen that the repulsive force is slowly increased in the fender of the present invention during the initial deformation stage as compared with the prior art fender of the construction shown in FIG. 2, thereby giving an optimum cushioning effect and that, while the prior art fender shown in FIG. 2 is such that the reaction force is rapidly increased immediately after the support walls have been buckled outwardly with respect to each other, the fender of the present invention has still a freedom of being further compressed before the elastic reaction force is rapidly increased, thereby exhibiting a relatively high energy absorbability.

Figure 11:
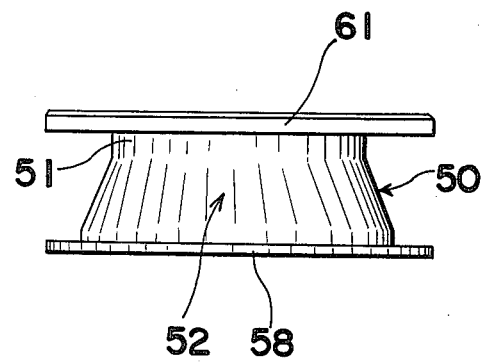
FIG. 11 is a side elevational view of a fender according to a further preferred embodiment of the present invention.

It is to be noted that, as shown in FIG. 11, the fender body 50 may have a buffer plate 61 rigidly mounted on the annular buffer block 51 for reducing the pressure concentration on the impact receiving surface 51a of the buffer block 51.

From the foregoing description, it has now become clear that the fender according to the present invention can exhibit its optimum performance to cushion the impact applied by the hull of the ship, irrespective of the direction in which the impact is applied thereto.

Although the present invention has fully been described in connection with the preferred embodiments thereof with reference to the accompanying drawings, it is to be noted that various changes and modifications are apparent to those skilled in the art. Such changes and modifications are to be understood as included within the true scope of the present invention unless they depart therefrom.

We claim:

1. A cushioning fender adapted to be mounted on one or both of an impact applying element and an impact receiving element for cushioning the impact applied from the impact applying element to the impact receiving element, said fender comprising a substantially cup-like body of one-piece construction made of an elastic material and including a circular buffer block having an outer surface adapted to serve as an impact receiving surface to which the impact is applied, said buffer block having a thickness within the range of about 0.15H to about 0.25H, wherein H represents the overall height of the fender and a hollow support wall depending from the circular buffer block and radially outwardly enlarged in a direction away from the buffer block, said hollow support wall being constituted by a leg section of uniform wall thickness and a heel section on one side of the leg section remote from the buffer block, one annular end of said heel section opposite to the leg section being formed integrally with a radially outwardly extending annular fitting flange, said buffer block having its peripheral face lying in a plane at right angles to the plane of the impact receiving surface and a diameter substantially equal to or smaller than the maximum inner diameter of the heel section.

2. A fender as claimed in claim 1, wherein at least an inner peripheral surface of the heel section lies in a plane at an angle relative to the inner peripheral surface of the leg section.

3. A fender as claimed in claim 2, wherein the boundary between the inner peripheral surfaces of the respective leg and heel section is located at a level spaced from the plane of a surface of contact of the fitting flange to the shore installation by a distance within the range of about 0.15H to about 0.3H, H representing the overall height of the fender.

4. A cushioning fender adapted to be mounted on one or both of an impact applying element and an impact receiving element for cushioning the impact applied from the impact applying element to the impact receiving element, said fender comprising a substantially annular body of one-piece construction made of an elastic material and including an annular buffer block having an outer annular surface adapted to serve as an impact receiving surface to which the impact is applied, said annular buffer block having a thickness within the range of about 0.15H to about 0.25H, wherein H represents the overall height of the fender and outer and inner support walls depending from the annular buffer block and protruding so as to diverge from each other in a direction away from the buffer block, each of said outer and inner support walls being constituted by a leg section of uniform wall thickness and a heel section on one side of the leg section remote from the buffer block, the outer and inner support walls having respective annular fitting flanges integrally formed therewith, the annular fitting flange of the outer support wall radially outwardly extending from an annular outer end of the associated heel section remote from the leg section of the outer support wall while the annular fitting flange of the inner support wall extends radially inwardly from an annular outer end of the associated heel section remote from the leg section of the inner support wall, said buffer block having its inner and outer peripheral faces each lying in a plane perpendicular to the plane of the impact receiving surface.

5. A fender as claimed in claim 4, wherein at least an inner peripheral surface of each of the heel sections of the inner and outer support walls, which faces the hollow defined between the inner and outer support walls, lies in a plane at an angle relative to the inner peripheral surface of each of the leg sections of the inner and outer support walls, which is contiguous to said inner peripheral surface of each of the heel sections.

6. A fender as claimed in claim 5, wherein the boundary between the inner peripheral surfaces of the respective leg and heel sections of each of the support walls is located at a level spaced from the plane of surfaces of contact of the fitting flanges to the shore installation by a distance within the range of about 0.15H to about 0.3H, H representing the overall height of the fender.

7. A fender as claimed in claim 4, wherein said buffer block has a width W within the range of a value, substantially equal to or greater than 0.75S, to a value substantially equal to or smaller than 1.3S, wherein S represents the maximum span between the heel sections of the respective support walls.

8. A fender as claimed in claim 5, wherein said buffer block has a width W within the range of a value, substantially equal to or greater than 0.75S, to a value substantially equal to or smaller than 1.3S, wherein S represents the maximum span between the heel sections of the respective support walls.

9. A fender as claimed in claim 6, wherein said buffer block has a width W within the range of a value, substantially equal to or greater than 0.75S, to a value substantially equal to or smaller than 1.3S, wherein S represents the maximum span between the heel sections of the respective support walls.

* * * * *